(12) United States Patent
Hassan et al.

(10) Patent No.: US 11,706,269 B1
(45) Date of Patent: Jul. 18, 2023

(54) CONFERENCE QUEUE AUTO ARRANGE FOR INCLUSION

(71) Applicant: Microsoft Technology Licensing, LLC, Redmond, WA (US)

(72) Inventors: Amer Aref Hassan, Kirkland, WA (US); Oscar Alejandro Ruiz Garcia, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/842,421

(22) Filed: Jun. 16, 2022

(51) Int. Cl.
*H04L 65/403* (2022.01)

(52) U.S. Cl.
CPC ................. *H04L 65/4046* (2013.01)

(58) Field of Classification Search
None
See application file for complete search history.

(56) References Cited

U.S. PATENT DOCUMENTS

| | | | | |
|---|---|---|---|---|
| 11,212,129 | B1* | 12/2021 | Sipcic | H04L 47/522 |
| 2015/0304607 | A1* | 10/2015 | Bader-Natal | H04L 12/1813 |
| | | | | 348/14.08 |
| 2017/0353508 | A1* | 12/2017 | Yoakum | H04L 65/4038 |
| 2021/0409465 | A1* | 12/2021 | Garrett | G10L 15/30 |

* cited by examiner

*Primary Examiner* — Mohamed Ibrahim
(74) *Attorney, Agent, or Firm* — Schwegman Lundberg & Woessner, P.A.

(57) ABSTRACT

A method and system for automatically adjusting a participation queue among multiple participants of a communication session are disclosed, comprising adding contribution requests to speak or share content in the communication session to the participation queue, calculating a participation metric for each of the multiple participants, determining an order of entries in the participation queue based on a comparison of the participation metrics of the respective participants in the participation queue to a determined participation metric threshold, to increase a priority of an entry of a respective participant having a calculated participation metric below the determined participation metric threshold.

20 Claims, 8 Drawing Sheets

CONFERENCE QUEUE AUTO ARRANGE FOR INCLUSION

TECHNICAL FIELD

The present disclosure generally refers to methods and systems for adjusting a participation queue to promote inclusion among multiple participants of a communication session in accordance with some embodiments.

BACKGROUND

The use of software and hardware technologies for meeting and communication services continues to increase as technology evolves. Managing communication sessions continues to become more burdensome as the number of features provided by meeting and communication services increases.

SUMMARY

Embodiments of the present disclosure include a method and system for automatically adjusting a participation queue among multiple participants of a communication session, comprising adding contribution requests to speak or share content in the communication session to the participation queue, calculating a participation metric for each of the multiple participants, determining an order of entries in the participation queue based on a comparison of the participation metrics of the respective participants in the participation queue to a determined participation metric threshold, to increase a priority of an entry of a respective participant having a calculated participation metric below the determined participation metric threshold.

Inputs from respective computing devices of at least two participants of the multiple participants can be received, wherein the inputs include a gesture captured by an image capturing device, a voice signal captured by an audio sensing device, or an input signal entered via a user input device, and determined to be representing an event indicative of contribution requests to speak or share content in the communication session. Contribution requests can be aggregated for each of the multiple participants of the communication session and added as entries to the participation queue, the participation queue including entries from at least two participants of the multiple participants. A participation metric can be calculated for each of the multiple participants of the communication session, the participation metric based at least in part on the aggregated contribution requests or an amount of verbal contribution for each of the multiple participants to the communication session. A participation metric threshold can be determined for the communication session based at least in part on the calculated participation metrics for each of the multiple participants of the communication session. An order of entries can be determined in the participation queue based on a comparison of the participation metrics of the respective participants in the participation queue to the determined participation metric threshold, to increase a priority, in the order of the participation queue, of an entry of a respective participant having a calculated participation metric below the determined participation metric threshold, and the determined order can be displayed to a first user of the communication session.

The claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media (i.e., not storage media) may additionally include communication media such as transmission media for wireless signals, etc.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

Figure 1:
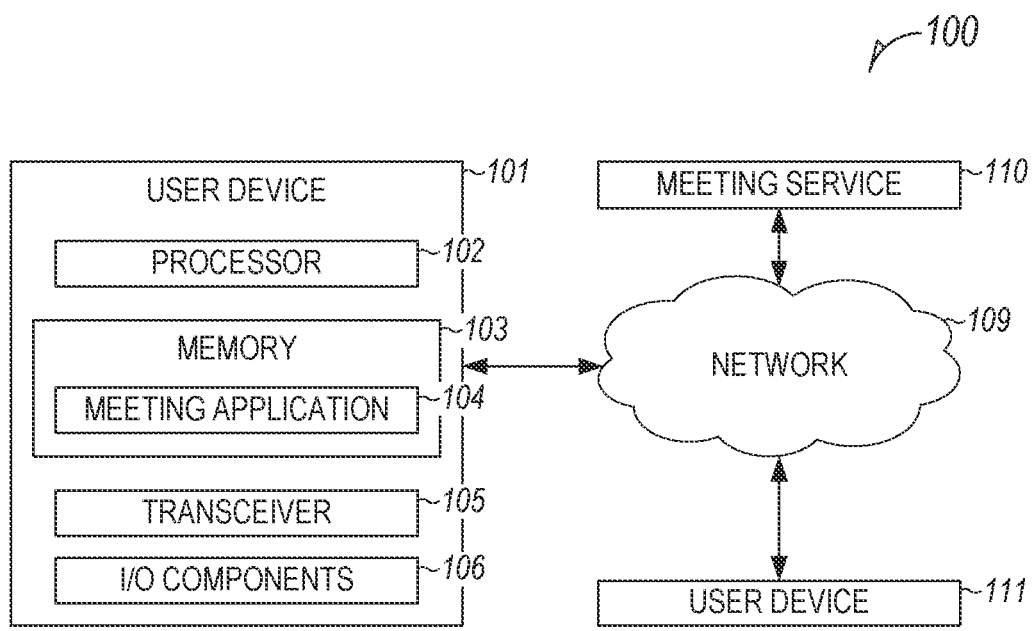
FIG. 1 illustrates an example system including a user device and a meeting service.

Communication sessions between multiple participants are often managed or controlled by an organizer, host, or one or more presenters. An organizer sets up the communication session between multiple participants. Participants generally include presenters and audience. Although established by the organizer, the communication session is managed by one or more hosts, such as initially assigned by the organizer or the organizer themselves, having control the features of the communication session during the communication session between the multiple participants. One or more presenters share information, such as audio, video, documents, applications, or other information to the one or more other participants during the communication session.

For example, in a business setting, communication sessions are often managed by a manager or group project lead. Presentation within the communication session is often handed off between participants in an organized way, similar to an in-person meeting. In certain examples, the communication session can include in-person and virtual attendance in various combinations or permutations.

In other examples, such as in a classroom or educational setting, audience members, generally students, have some ability to control one or more settings or features of their respective meeting applications or user devices, but one or more hosts or presenters, generally a teacher, maintains the ability to control what is shown or provided to the multiple participants, including controlling the order of audio or video participation (or other sharing) in the communication session.

The audience of a communication session is often muted while a presenter presents or shares in a communication session to limit disruptions to the presentation. In certain examples, one or more hosts or presenters can mute one or more other participants, or control when the one or more other participants can un-mute themselves to provide audio to the remaining participants. In certain examples, an order of participation in the communication session can be organized by creating and maintaining a participation queue through the meeting service, such as through a meeting application executed on a user device of or associated with an organizer, host, or one or more presenters of the communication session.

During a communication session, participants can select a control to virtually "raise their hand" to let the one or more hosts, presenters, or other participants know that they want to contribute without interrupting the communication session. In response, a "hand" icon can be displayed in a participant area of the meeting application next to the name of the participant raising their hand, and a notification can be provided to the one or more hosts or presenters. The participant area can show who has raised their hand and, if more than one participant has raised their hand, in which specific order, such as indicated by a number in the order in which they raised their hand (e.g., "1" indicating first, "2" indicating second, etc.) or in the order that the participants are displayed in the participant area. Participants can lower their hands by re-selecting the control, or the one or more hosts or presenters can lower individual or all participant hands.

As groups of people come together in all settings, it's important to ensure that all people are heard, or are at least given an opportunity to be heard. Inclusion enhances engagement and innovation, and creates a sense of belonging, improving participant experience. This is as true individually as it is with respective groups in an organization.

For example, projects in an organization are often organized, through a project manager, in different groups (e.g., production, finance, marketing, engineering, user interface, regulatory compliance, legal, etc.). It's important to ensure that, in a communication session about a specific project, that all groups are heard from, and if one group, or different members of one group, dominate participation of the communication session, that the one or more hosts understand that specific groups or one or more key stakeholders, although viewing the communication session, may not have provided necessary input.

The present inventors have recognized, among other things, that the order in which a participant raises their hand in a communication session may not be the best way to organize or manage the order in which the participants present in the communication session, or more particularly, the order in which the participants are displayed the one or more hosts or presenters of the communication session. Further, for large conference rooms or large classroom environments, or for recurring communication sessions with the same participants meeting repeatedly, manual tracking of participation of participants in the meeting session can be burdensome, if not altogether impossible, especially when viewed in the negative, as not tracking those who have presented and for how long, but those who have not, such as to ensure inclusion of all voices.

A technical solution contemplated herein provides, in certain examples, systems and methods to automatically adjust a participation queue displayed to one or more hosts or presenters of a communication session in a specific way based on a specific determination of participation by respective participants of a communication session to address the technical problem of managing possibly large groups of participants, in a control area of a meeting application having limited size, while ensuring inclusion of key stakeholders across one or more communication sessions in real-time. In an example, the participation queue displayed to the one or more hosts or presenters can be automatically adjusted by calculating a participation metric for each of the multiple participants and increasing a priority of an entry of a respective participant in the participation queue having a calculated participation metric below a determined participation metric threshold based on the calculated participation metrics for each of the multiple participants of the communication session.

FIG. 1 illustrates an example computer system 100 for providing meeting services including first and second user devices 101, 111 and a meeting service 110 coupled to a network 109.

The first user device 101 is exemplary, and can include a processor 102 (e.g., one or more processors), a memory 103, a transceiver 105, and one or more input/output (I/O) components 106. The first and second user devices 101, 111 can include one or more electronic devices, such as a mobile phone, a laptop computer, a desktop computer, a tablet computer, or various combinations thereof. Users of the first and second user devices can include a presenter or organizer of a communication session, one or more participants, or combinations thereof. The memory 103 can include a meeting application 104, in certain examples configured to interact with or connect to the meeting service 110. While the meeting application 104 can be executed on the first user device 101 (or one or more other user devices), the meeting service 110 is separate and remote from the first user device, and can include a server, network, or cloud-based services accessible over the network 109.

In an example, the meeting application 104 can include a local client, such as a Microsoft Teams client, a Skype client, etc., installed on a respective user device and connected to the meeting service 110, such as a cloud-based meeting service or platform (e.g., Microsoft Teams, Skype, etc.). In other examples, the meeting application 104 can include a virtual application (e.g., a network-, web-, server-, or cloud-based application) accessing resources of a respective user device, or combinations of a local client and a virtual application, etc.

The meeting service 110 can manage a communication session, including communication streams, such as emails, documents, chats, comments, texts, images, animations, hyperlinks, or voice or video communication for users associated with one or more online or other communication sessions through meeting applications executed on connected devices, such as the first and second user devices 101, 111 or one or more other devices including hardware and software configured to enable meeting applications or one or more other communication platforms to communicate to or from the respective devices.

Figure 2:
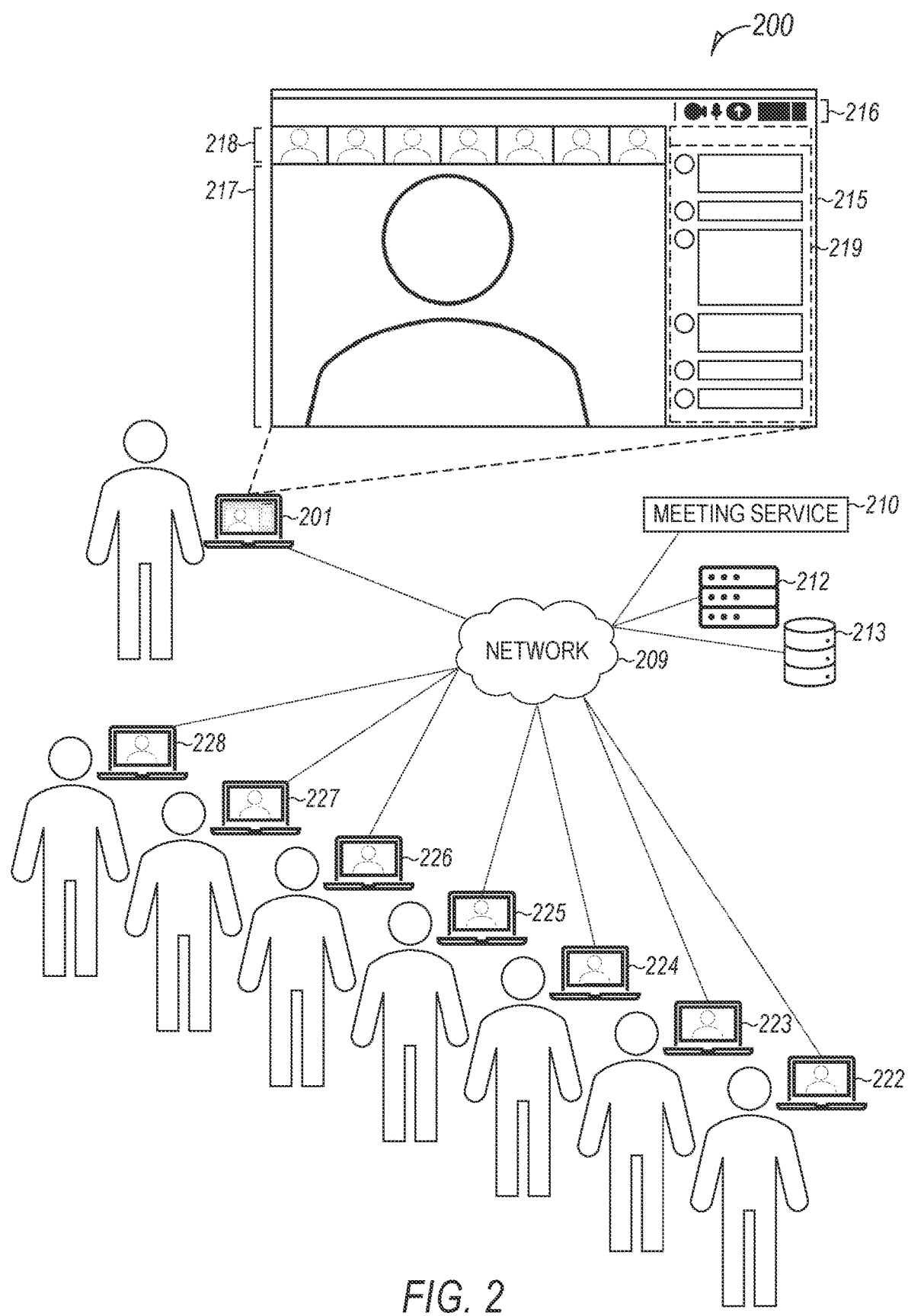
FIG. 2 illustrates an example communication session between multiple participants of a meeting service.

FIG. 2 illustrates an example communication session 200 between multiple participants having respective user devices executing respective meeting applications coupled to a meeting service 210 through a network 209. The meeting service 210 can include or otherwise be coupled to one or more servers or databases, such as a server 212 or a database 213, such as to store or process user information or provide one or more services associated with the communication session, including presentation of the communication session, as illustrated in FIG. 2.

The communication session 200 includes a first user, such as a host or a presenter, coupled to a first user device 201 executing a meeting application and sharing information, such as a representation of the first user with accompanying audio data of the first user or other shared information (e.g., a video stream of an active portion of an active screen of the first user device 201, one or more applications executed on the first device 201, a document, etc.), and providing such information to the meeting service 210 for management and display, over the network 209, to multiple second user devices 222-228 of multiple participants or audience members, each executing a meeting application connected to the meeting service 210.

In an example, a meeting application view 215 (e.g., a host view) of the communication session 200 can include one or more controls 216 for the meeting application, a representation of the first user 217 (e.g., a video representation, avatar, profile image, etc.), representations of one or more of the multiple participants 218 (e.g., video representations, avatars, profile images, etc.) and a transcript box 219 configured to show live transcribed text of the communication session 200. In other examples, the area of the transcription box 219 in the meeting application view 215 can include other information, such as a list of participating or invited users, a message (or chat) box for user discussion, or boxes or displays of one or more other types of information or interaction.

Figure 3:
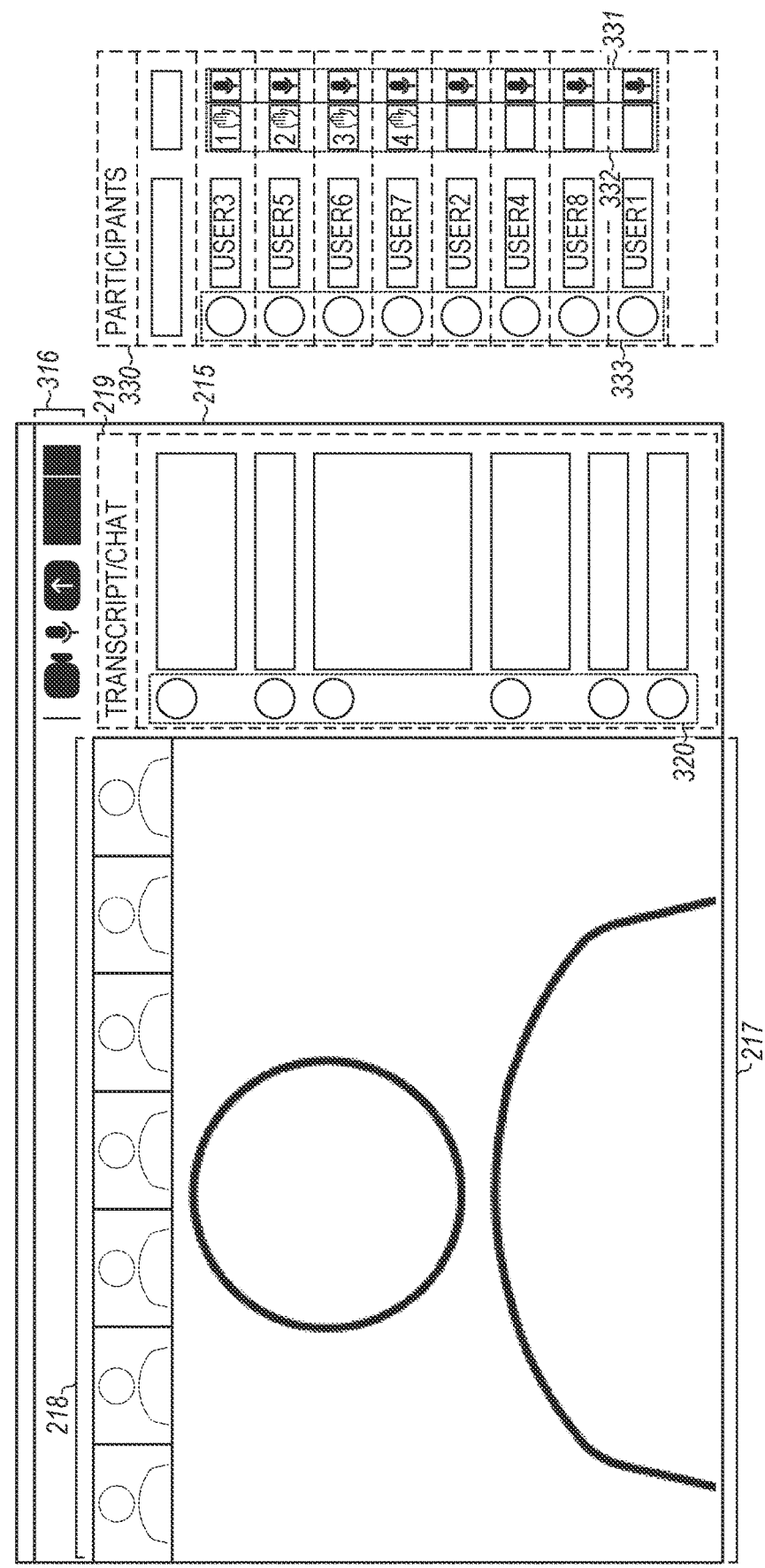
FIGS. 3-6 illustrates an example meeting application view of a communication session between multiple participants, including different meeting application features.

FIG. 3 illustrates an example communication session 300 including a meeting application view 215 between multiple participants, one or more controls 216, representations of the first user and the multiple participants 217, 218, and the optional transcript box 219, similar to that illustrated in FIG. 2. The transcript box 219 includes chat boxes representing text spoken in the communication session 300 adjacent avatars 320 (e.g., representative images, selected icons, etc.) of the respective participants speaking such text.

The communication session 300 includes, in addition to, alternatively, or instead of the transcript box 219, an optional participant box 330, such as selectable by the one or more controls 216, and configured to be optionally located in the place of the transcription box 209. In other example, the location of the optional transcript box 219 can include one or more other features, as illustrated herein or otherwise.

The participant box 330 can include a list of participating or invited users (e.g., USER1-USER8, where USER1 is the first user, or the host of the communication session 300 and USER2-8 are optional audience participants, etc.) and their respective avatars 333, as well as microphone icons 331 for each respective participant illustrating whether or not a microphone of the user device of the respective participant is muted, not-muted, or receiving/transmitting audio information, such as by changing a color of the icon or changes illustrating receiving/transmitting audio, etc.

The participant box 330 can optionally include a raised hand box 332 illustrating which, of any, of the participants has raised their hands, such as using the one or more controls 216 of their respective meeting application, to indicate they would like to contribute in the communication session 300 (e.g., the "hand" icon adjacent USER3 and USER5-USER7) and a number to indicated the specific order in which they raised their hands (e.g., a "1" adjacent USER3 indicates they were the first to raise their hand, etc.), creating a participation queue. Participants can lower their hands by re-selecting the control, or the one or more hosts or presenters can lower individual or all participant hands, such as after a user has participated or if a time for participation is over.

Figure 4:
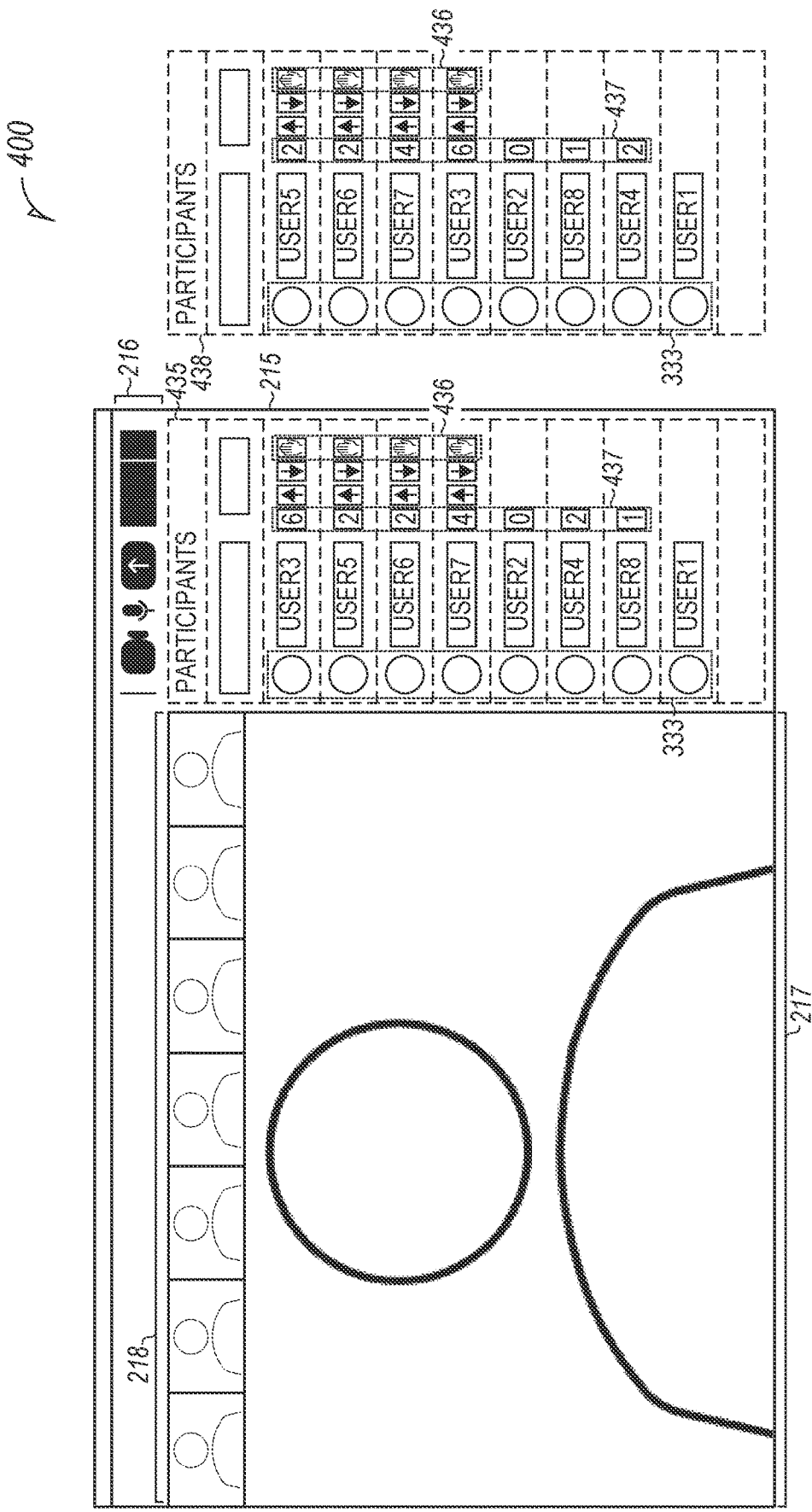

FIG. 4 illustrates an example communication session 400 including a meeting application view 215 between multiple participants, one or more controls 216, and representations of the first user and the multiple participants 217, 218, similar to those illustrated in FIGS. 2-3, and additionally, optional second and third participant boxes 435, 438.

The second participant box 435 can include a list of participating or invited users and their respective avatars 333, and a first set of users with respective raised hand boxes 436 selected (e.g., USER3 and USER5-USER7) as a participation queue. In certain examples, audience of the communication session 400 (e.g., USER2-USER8) additionally each include respective participation metrics 437 indicating an aggregate number of contribution requests (e.g., raised hand selections), actual contributions, or other calculated participation metrics for each of the attendees of the communication session 400, such as will be further described herein.

In an example, all participants, including the one or more hosts, such as the first user (USER1), etc., can have a corresponding participation metric. Up and down arrows are illustrated between the participation metrics 437 and the raised hand boxes 436. In certain examples, the up and down arrows can be used, such as by the one or more hosts or presenters, such as to adjust positions of the participation queue.

The third participation box 438 is similar to the second participation box 435, but the entries in the participation queue have been automatically sorted to increase a priority of participants in the participation queue having a smaller participation metrics 437, such as to promote inclusion among multiple participants of the communication session 400.

Figure 5:
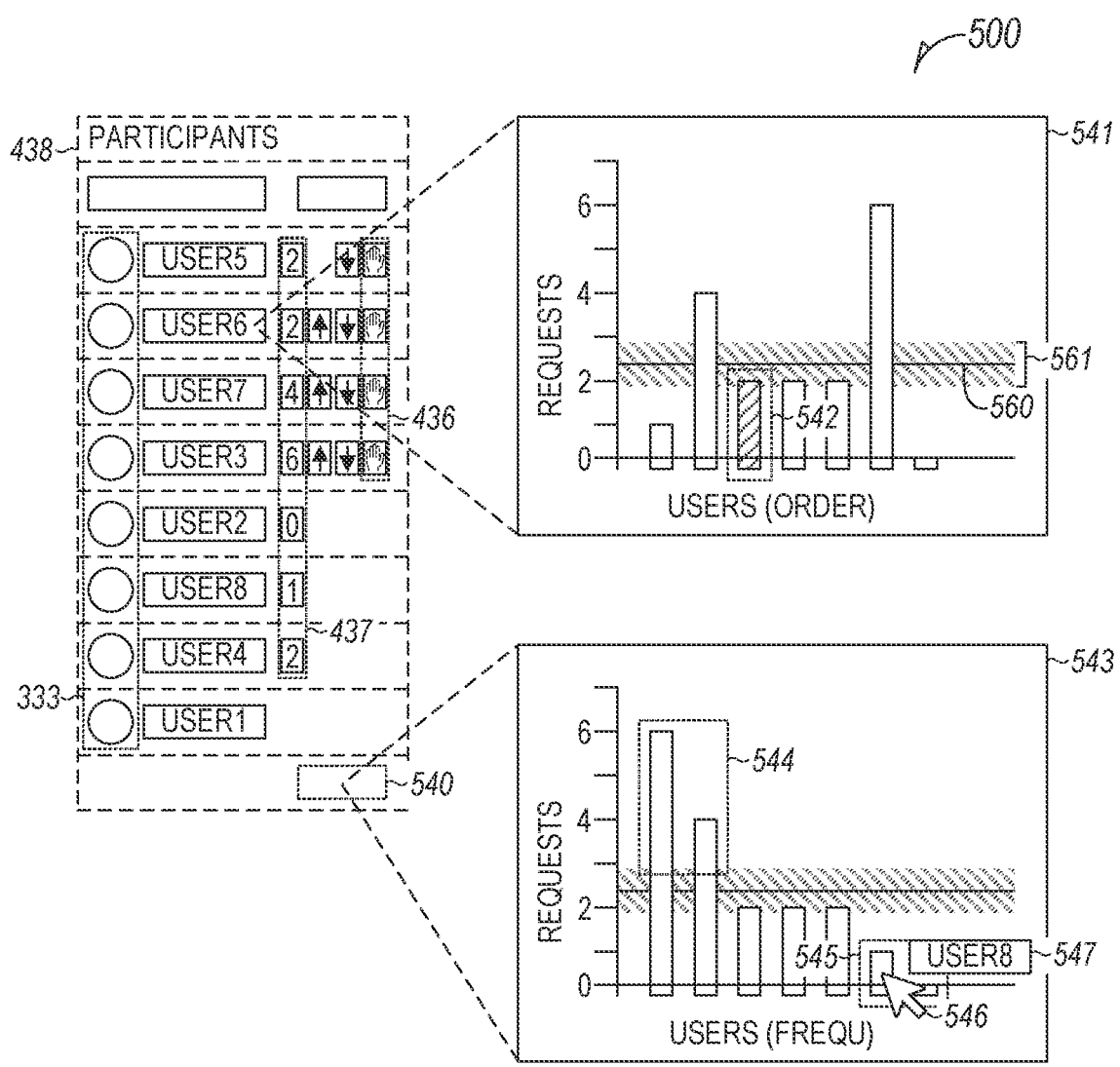

FIG. 5 illustrates an example participation box 438, such as that illustrated in FIG. 4, additionally including a first and second breakouts 541, 543 illustrating participation metrics for respective participants in a group of multiple participants.

The first breakout 541 illustrates an aggregate number of participation requests for each of the users sorted by order (e.g., from USER8-USER2) in relation to a determined participation metric threshold 560 and a determined participation metric threshold range 561. In certain examples, the determined participation metric threshold 560 can be determined as an average (or median) of the determined participation metrics of the audience of the communication session (or recurring communication session), including or excluding the one or more hosts or presenters. Determining the participation metric threshold 560 as a statistical measure of the participation metrics of the audience itself can automatically adjust for differences in communication session management styles between different hosts or presenters. In certain examples, the determined participation metric range 561 can be determined as a percentage above and below the determined participation metric threshold 560 (e.g., +/−20%, etc.). In certain examples, only participants having a determined participation metric below one of the determined participation metric threshold 560 or the determined participation metric range 561 can have their priority increased in the participation queue. Adjusting the participation queue, in certain examples, is not so much about discouraging over-participation so much as promoting under-participation and making it easier for organizers, hosts, and presenters to identify and promote inclusion among all participations.

The first breakout 541 can be triggered by selection of a specific user (e.g., selection of USER6 in FIG. 5), or by selection of one or more other controls, such as a participation box control 540, etc. In this example, the first breakout 541 highlights requests of USER6 542, as selection of USER6 triggered display of the first breakout box 541. In this example, the selected user, USER6, has a participation metric within the determined participation metric range 561 and, in certain examples, would not be adjusted up in the participation queue, even if behind another user having more a larger participation metric (e.g., USER7, USER3, etc.). In other examples, such as if the participation queue is sorted by strict priority, a priority of the selected user, USER6, in the participation queue could be increased to be above that of USER3 or USER7, even if USER6 was added to the participation queue after USER3 and USER7.

The second breakout 543 can be triggered by selection of the participation box control 540 and illustrates an aggregate number of participation requests for each of the users sorted by frequency (e.g., from most participation requests, 6 by USER3, to least participation requests, 0 by USER2). The second breakout 543 illustrates a first highlight 544 illustrating users having participation metrics above an upper measure of the determined participation metric range 561 (e.g., USER3 and USER7), and a second highlight 545 illustrating users having participation metrics below a lower measure the determined participation metric range 561 (e.g., USER4 and USER8). Placing a mouse cursor 546 over the data in a respective breakout can trigger display of pop-up text 547 describing data under the mouse cursor 546 or the name of the user associated with the data under the mouse cursor 546. In this example, the pop-up text calls out "USER8".

Figure 6:
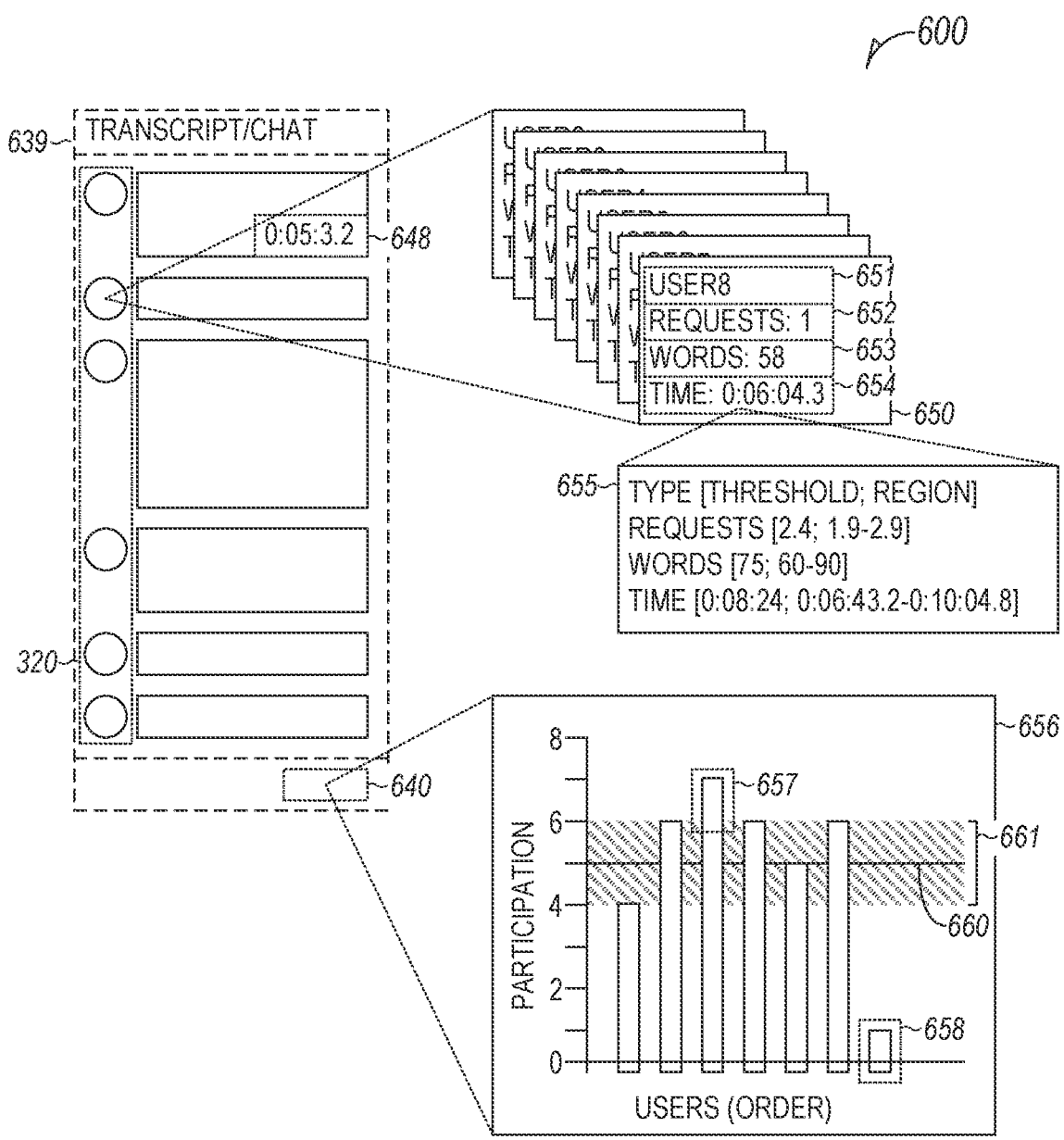

FIG. 6 illustrates an example transcript box 639 similar to the transcript box 219 illustrated in FIG. 2 including chat boxes representing text spoken in a communication session adjacent avatars 320 of the respective participants speaking such text. The transcript box 639 additionally includes third, fourth, and fifth breakouts 650, 655, 656 illustrating participation metrics respective participants in a group of multiple participants. In certain examples, the chat boxes in the transcript box 639 can include a timestamp 648, such as a time (start time, end time, duration, or combinations thereof) of the text in the particular chat box.

The third breakout 650 illustrates participation information of a selected user for a respective communication session (or recurring communication session), including a user identity 651 (e.g., "USER8"), a number of aggregate contribution request 652 (e.g., 1), an amount of verbal contribution 653 (e.g., 58), and a time of contribution 654 (e.g., 0:06:04.3). In an example, the verbal contribution 653 can include spoken words by the respective user, such as determined by the transcript, typed words in a chat or message box, or combinations thereof, etc. In other examples, the time of contribution 654 can include active microphone time of the user in the communication session, aggregate duration time of the timestamps (e.g., the timestamp 648) attributable to the user, etc. The third breakout 650 can be triggered by selection of a specific user, avatar, or one or more other controls, such as a transcript box control 640, etc.

The fourth breakout 655 illustrates threshold and region information for the communication session. In an example, the threshold can include an average of the respective participation metrics or information for the respective users of communication session (e.g., audience, all participants, etc.). For example, the audience of a communication session (e.g., USER2-USER8 of the communication session 400) can have the following threshold (e.g., average) and region (e.g., +/−20%) information [threshold; region]: contribution requests [2.4; 1.9-2.9]; words [75; 60-90]; and time [0:08:24; 0:06:43.2-0:10:04.8]. The fourth breakout 655 can be triggered by selection of specific participation information or one or more other controls, such as a transcript box control 640, etc.

The fifth breakout 656 illustrates calculated composite participation metrics for each of the respective users sorted by order (e.g., from USER8-USER2) in relation to a determined composite participation metric threshold 660 (e.g., an average) and a determined composite participation metric threshold range 661 (e.g., +/−20% of the average). In an example, the participation metric can include a composite function of contribution requests and verbal communication (e.g., the number of contribution requests multiplied by one or more of the active microphone time, the number of words of the user from a transcript box, the number of chats or messages of the user, etc.). The threshold and range can be determined for the communication session, and the calculated participation metrics can be displayed and used to increase a priority in the order of the participation queue of respective participants having calculated participation metrics below one or more of the threshold or range, etc.

In other examples, the calculated participation metrics can be determined as a relative composite of multiple individual components of participation information with respect to the determined thresholds or ranges. Multiple pieces of participation information can individually be compared to one or more of the determined thresholds and ranges, scored with respect to such threshold and ranges, and aggregated into a composite participation metric.

For example, with respect to contribution requests, as illustrated in the participation metrics 437 in FIGS. 4 and 5 (and as illustrated in the fourth breakout 655), the average contribution request for users of the communication session is 2.4 with a determined threshold range (+/−20% of the average) can be between 1.9 and 2.9. Each user can be scored relative to the determined threshold range. Contribution requests above the threshold range (above 2.9) can be scored as a "3", within the threshold range (between and including 1.9 and 2.9) can be scored a "2", below the threshold range but above 0 (between 0 and 1.9) can be scored a "1", and 0 can be scored a "0".

Similarly, with respect to words (e.g., spoken words by the respective user, such as determined by the transcript, typed words in a chat or message box, or combinations thereof, etc.), the average words for users of the communication session are 75 with a determined threshold range (+/−20% of the average) can be between 60 and 90. Each user can be scored relative to the determined threshold range. Words above the threshold range (above 90) can be scored as a "3", within the threshold range (between and including 60 and 90) can be scored a "2", below the threshold range but above 0 (between 0 and 60) can be scored a "1", and 0 can be scored a "0".

With respect to time (e.g., active microphone time of the user in the communication session, aggregate duration time of the timestamps attributable to the user, etc.), the average time for users of the communication session is 0:08:24 (8 minutes and 24 seconds) with a determined threshold range (+/−20% of the average) can be between 0:06:43.2 and 0:10:04.8. Each user can be scored relative to the determined threshold range. Time above the threshold range (above 0:10:04.8) can be scored as a "3", within the threshold range (between and including 0:06:43.2 and 0:10:04.8) can be scored a "2", below the threshold range but above 0 (between 0 and 0:06:43.2) can be scored a "1", and 0 can be scored a "0".

For example, example composite participation metrics ([contribution requests, words, time]) for the audience of the communication session (e.g., USER2-USER8 of the communication session 400) can be computed as an aggregate of the composite measures using one or more functions (e.g., a sum or product of one or more individual metrics or relative individual metrics, or various combinations thereof, etc.).

TABLE 1

Composite Participation Metric

| Composite Participation Metric | |
|---|---|
| USER8 [1, 1, 2] | 4 |
| USER7 [3, 1, 2] | 6 |
| USER6 [2, 2, 3] | 7 |
| USER5 [2, 3, 1] | 6 |
| USER4 [2, 1, 2] | 5 |
| USER3 [3, 0, 3] | 6 |
| USER2 [0, 1, 0] | 1 |

Using the determined composite participation metrics in Table 1 and illustrated in the fifth breakout 656, the determined composite participation metric threshold 660 can be 5 with a determined composite participation metric threshold range (+/−20% of the average) can be between 4 and 6. A first highlight 657 illustrates users having composite participation metrics above an upper measure of the determined composite participation metric threshold range 661 (e.g., USER6), and a second highlight 658 illustrates users having composite participation metrics below a lower measure of the determined composite participation metric threshold range 661 (e.g., USER2). The fifth breakout 656 can be triggered by selection of a specific user, avatar, or one or more other controls, such as a transcript box control 640, etc.

In other examples, one or more other relative or composite scoring conventions can be used, as well as comparison to the threshold or one of the upper or lower measure of the range, etc.

Figure 7:
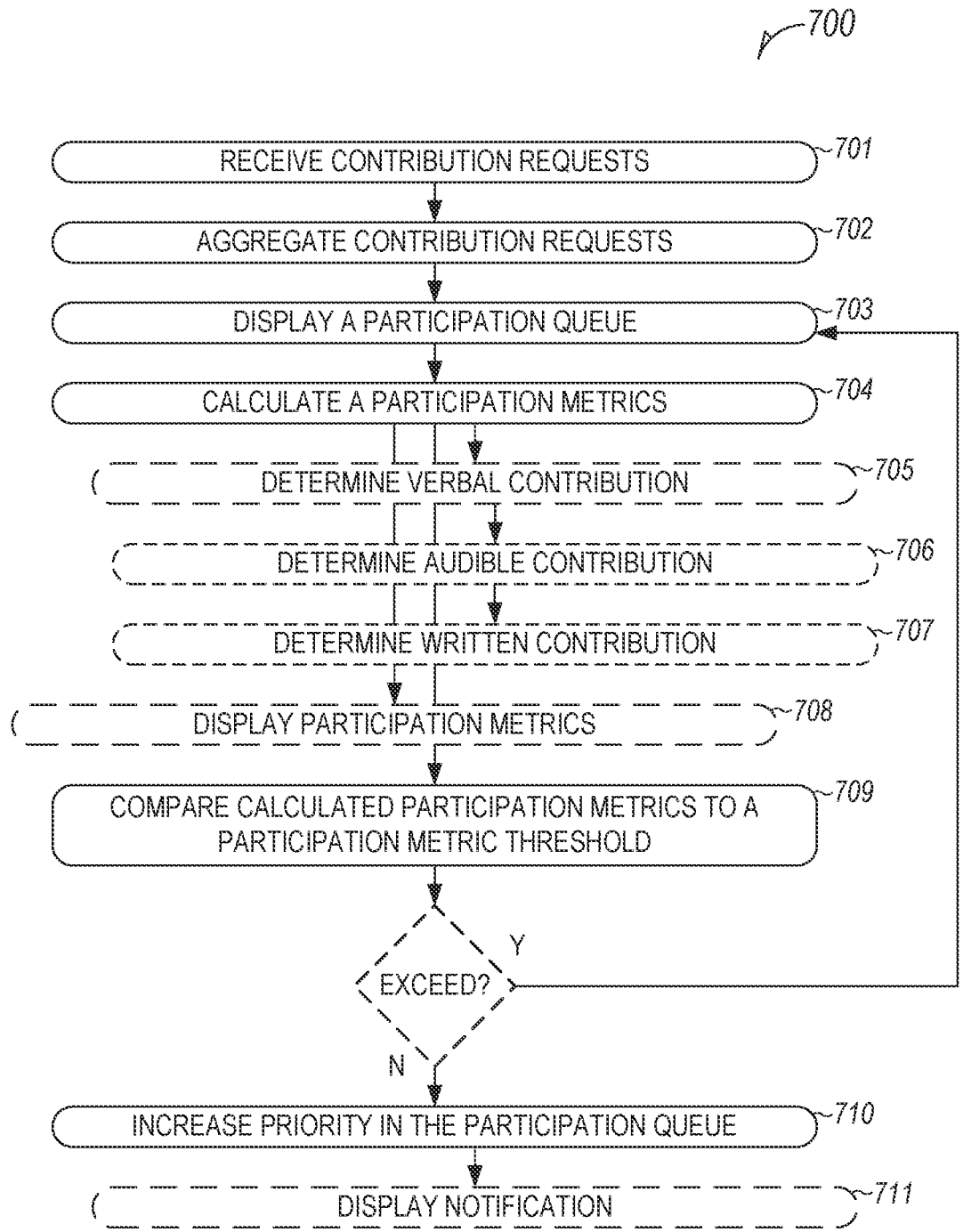
FIG. 7 illustrates an example method of adjusting a participation queue among multiple participants of a communication session.

FIG. 7 illustrates an example method 700 of adjusting a participation queue among multiple participants of a communication session managed by a meeting service. The communication session can include a single communication session or, in other examples, one or more of a series or sequence of recurring meeting sessions, such as with the same or similar group of participants, etc. In an example, the meeting service can be connected to one or more meeting applications executed on respective computing devices (e.g., user devices, etc.) of the multiple participants. The respective computing devices can include respective user interface (U/I) components configured to capture, receive, or transmit one or more input signals or interactions of the respective participant to a meeting application executed on the respective computing devices. The meeting applications can be connected to a meeting service, such as through a network, the meeting service separate and remote from the computing devices of the multiple participants. In certain examples, one or more of the following steps can be performed by a meeting application executed on a respective computing device of a participant, by the meeting service remote from the computing devices of the multiple participants, by one or more components connected to the meeting service, or combinations thereof.

At step 701, contribution requests can be received from one or more of the multiple participants of the communication session. In an example, inputs can be received from respective computing devices of at least two participants of the multiple participants, as to adjust a participation queue, such as by promoting one entry ahead of another, two contribution requests are required.

The inputs can include, among other things, one or more of a gesture captured by an image capturing device, a voice signal captured by an audio sensing device, or an input signal entered via a user input device. In an example, the input signal entered via the user input device can include a selection of a raised hand box by a participant in a user interface portion of a meeting application, such as illustrated herein, etc. In other examples, a specific word or phrase can be detected from a participant by the audio sensing device, in certain examples, while the participant is muted by the host. In yet other examples, the image capture device can detect, through the meeting application, the meeting service, or through one or more image recognition processes executed on one or more component illustrated herein, that the user has raised their hand during the presentation.

In an example, the received inputs can be determined as representing an event indicative of contribution requests to speak or share content in the communication session. For example, a notification can be provided to the host of the received input, or to the user, such as to verify that a contribution request is intended. In other examples, an initial input can be received, such as by one or more of the meeting application or the meeting service, and additional processing can be performed, or confirmation can be provided to the participant or the host. In certain examples, upon receiving the input, a provisional contribution request can be determined for the participant, followed by confirmation by additional processing or confirmation, such that if the input is subsequently determined or confirmed as an event indicative of a contribution request, an intervening is not placed in the participation queue before the received input. In other examples, two indications are required (e.g., a specific word or phrase and an image representing that the user has raised their hand on camera, a selection of a raised hand box followed by confirmation, various combinations or permutations thereof, etc.).

At step 702, contribution requests, such events determined to be indicative of contribution requests, can be aggregated for each of the multiple participants, such as by the meeting application or the meeting service. For example, respective meeting applications of the multiple participants can determine or aggregate contribution requests for their respective users, and provide the determined information to the meeting service for further storage, processing, or use. In other examples, respective meeting applications can be used to provide information from the respective participant to the meeting service for storage, processing, or use, etc. In certain examples, the aggregated contribution requests can be stored for later use, such as in calculating participation metrics, thresholds, ranges, etc.

At step 703, a participation queue can be displayed, such as to one or more organizers, hosts, or presenters of the communication session, for example, to manage participation in the communication session. In other examples, the participation queue can be displayed to the multiple participants, such as to encourage participant management of the communication session. In certain examples, the participation queue can be displayed using a display of a computing device.

At step 704, participation metrics can be calculated, such as a participation metric for each of the multiple participants of the communication session. In an example, respective meeting applications of the multiple participants can calculate participation metrics for their respective participants. In other examples, the participation metrics can be calculated by the meeting service. In an example, the respective participation metrics can be determined based on the aggregated contribution requests for the respective participations. In other examples, the respective participation metrics can be calculated based on an amount of verbal contribution for each of the multiple participants to the communication session, or combinations therewith.

At step 705, an amount of verbal contribution can be determined for each of the multiple participants o the communication session, such as by the meeting application or the meeting service. Verbal contribution can include contribution having words, including written or spoken words, attributable to a specific participant.

At step 706, audible contribution can be received, such as from one or more input devices of the computing devices of respective participants. The meeting service can receive the audible contributions from the respective participants and, among other things, create a transcript of the communication session. In certain examples, the audible contribution can be determined based on the resulting transcript. In other examples, the meeting service can track the active audio presenter of the communication session, and the audible contribution can be determined based on an active time of the active audio of the respective participant.

At step 707, written contribution can be received, such as in one or more of a chat box or a message box associated with the communication session. In certain examples, the written contribution can include a number of words provided by each of the respective participants.

In an example, the participation metric can be determined as a composite of one or more of the received contribution requests and the determined verbal contribution, including at least one of audible contribution or written contribution to the communication session.

At step 708, the determined participation metrics can be optionally displayed, such as to one or more organizers, hosts, presenters, audience, or other participants of the communication session, for example, to manage participation in the communication session.

At step 709, calculated participation metrics can be compared to a participation metric threshold. The participation metric threshold can include a statistical measure of one or more of the participation metrics of the users, and in certain examples, a range can be determined based on the threshold, such as a percentage above and below the threshold (e.g., +/−20%, etc.).

In certain examples, if the calculated participation metrics exceed the participation metric threshold, no adjustment to the participation queue is necessary, and the method can return to step 703. However, if the calculated participation metric does not exceed the participation metric threshold (e.g., an average of the calculated thresholds, etc.) such as a lower measure of a threshold range, then, at step 710, a priority of the respective participation metric can be increased.

At step 711, a notification can be displayed to the meeting organizer, the host, one or more presenters, etc., such as if one or more of the calculated participation metrics does not exceed a determined threshold amount, such as a lower measure of a participation threshold range, etc.

Although different queue processing is illustrated herein, such as determination of composite participation metrics, in other examples, other combinations can be determined. For example, participation metrics can be determined for each respective participant of a communication session. In certain examples, a composite participation metric can be determined as a product of the number of times a participant provides a contribution request and a duration of time that the participant speaks in the communication session. For recurring communications sessions, such as in a classroom setting, the composite participation metric can be determined across the last several classes, across all previous classes, etc. In other examples, participation trends can be determined as a change in participation metrics across multiple communication settings, or a short-term average (e.g., an average of the last session or several sessions) relative to all sessions, etc. If a respective participation metric for a user is decreasing and below or near a participation threshold, the organizer, host, or presenter can receive a notification to check in with the respective participant. In other examples, the notification can be provided for all participants below the participation threshold.

In other examples, the systems and methods described herein can further be expanded to cover particular groups of users, such as different participant groups within a larger communication session. For example, a project manager of a company can organize a series of communication sessions with respect to a new product design of the company. The communication sessions can be set up with users in particular groups. The individual participation metrics can be determined for each respective participant in the communication session, as described herein. However, in addition, participation metrics can be aggregated across the specific participant groups to determine that each group, if not each participant, has had a change to provide feedback. If an entire group has not shared or participated, the project manager can be notified such that they separately or purposefully solicit feedback from all groups working on the new product. Group thresholds and ranges can be determined, similar to that described above with respect to participants, and used to determine relative participant metrics for the specific groups.

In certain examples, displaying the participation metrics to the participants can create a self-managing environment, where users below the threshold may start to provide more during the meeting, and those over-sharing may temper back themselves, without requiring action by the organizer. Showing such thresholds and ranges is a clear communication as to what is expected of the participants by management, aligning desired and received efforts. In other examples, such as having specific groups of participants provide more feedback during specific times in a project, etc.

Figure 8:
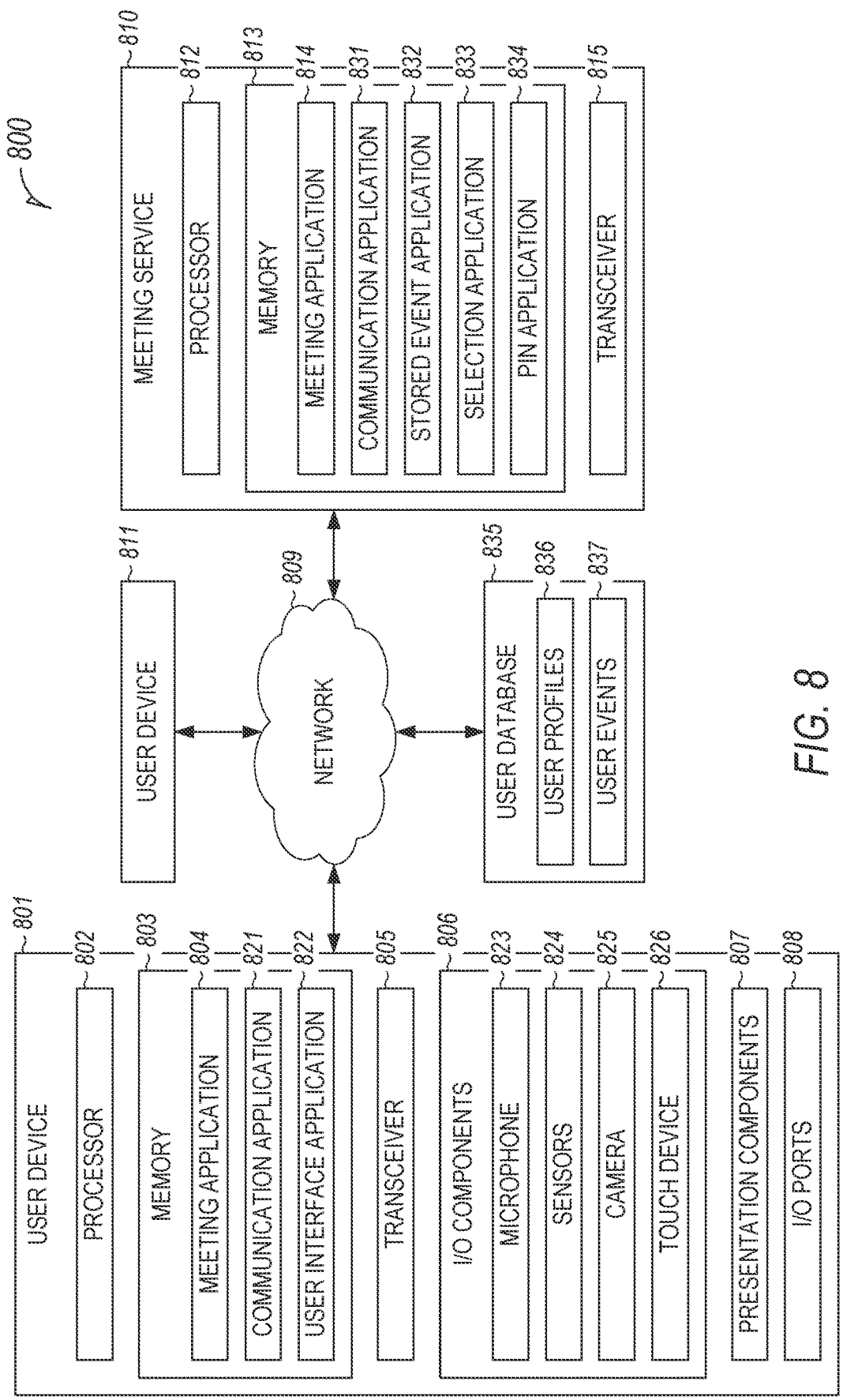
FIG. 8 illustrates an example networking environment including one or more user devices, a communication server, and a user database communicating over a network.

FIG. 8 illustrates an example system 800 including first and second user devices 801, 811 in a networking environment including a meeting service 810 and a user database 835 communicating over a network 809.

The first user device 801 is exemplary, and can include a processor 802 (e.g., one or more processors), a memory 803, a transceiver 805, input/output (I/O) components 806, one or more presentation components 807, and one or more I/O ports 808. The first user device 801 can take the form of a mobile computing device or any other portable device, such as a mobile telephone, laptop, tablet, computing pad, notebook, gaming device, portable media player, etc. In other examples, the first user device 801 can include a less portable device, such as desktop personal computer, kiosk, tabletop device, industrial control device, etc. Other examples can incorporate the first user device 801 as part of a multi-device system in which two separate physical devices share or otherwise provide access to the illustrated components of the first user device 801.

The processor 802 can include any quantity of processing units and is programmed to execute computer-executable instructions for implementing aspects of the disclosure. The instructions may be performed by the processor or by multiple processors within the computing device or performed by a processor external to the first user device 801. In some examples, the processor 802 is programmed to execute methods, such as the one or more methods illustrated herein, etc. Additionally, or alternatively, the processor 802 can be programmed to present an experience in a user interface ("UI"). For example, the processor 802 can represent an implementation of techniques to perform the operations described herein.

The transceiver 805 can include an antenna capable of transmitting and receiving radio frequency ("RF") signals and various antenna and corresponding chipsets to provide communicative capabilities between the first user device 801 and one or more other remote devices. Examples are not limited to RF signaling, however, as various other communication modalities may alternatively be used.

The presentation components 807 can include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user of the first user device 801 or provide information visibly or audibly on the first user device 801. For example, the first user device 801 can include a smart phone or a mobile tablet including speakers capable of playing audible search results to the user. In other examples, the first user device 801 can include a computer in a car that audibly presents search responses through a car speaker system, visually presents search responses on display screens in the car (e.g., situated in the car's dashboard, within headrests, on a drop-down screen, etc.), or combinations thereof. Other examples present the disclosed search responses through various other display or audio presentation components 812.

I/O ports 808 allow the first user device 801 to be logically coupled to other devices and I/O components 816, some of which may be built into user device 801 while others may be external. I/O components 806 can include a microphone 823, one or more sensors 824, a camera 825, and a touch device 826. The microphone 823 can capture speech from the user and/or speech of or by the user. The sensors 824 can include any number of sensors on or in a mobile computing device, electronic toy, gaming console, wearable device, television, vehicle, or other user device 801, such as one or more of an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user or the environment. The camera 825 can capture images or video of or by the user. The touch device 826 can include a touchpad, track pad, touch screen, or other touch-capturing device. In other examples, the I/O components 806 can include one or more of a sound card, a vibrating device, a scanner, a printer, a wireless communication device, or any other component for capturing information related to the user or the environment.

The memory 803 can include any quantity of memory associated with or accessible by the first user device 801. The memory 803 can be internal to the first user device 801, external to the first user device 801, or a combination thereof. The memory 803 can include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the first user device 801. The terms computer-readable medium, machine readable medium, and storage device do not include carrier waves to the extent carrier waves are deemed too transitory. The memory 803 can take the form of volatile and/or nonvolatile memory, can be removable, non-removable, or a combination thereof; and can include various hardware devices, e.g., solid-state memory, hard drives, optical-disc drives, etc. Additionally, or alternatively, the memory 803 can be distributed across multiple user devices, such as in a virtualized environment in which instruction processing is carried out on multiple ones of the first user device 801. The memory 803 can store, among other data, various device applications that, when executed by the processor 802, operate to perform functionality on the first user device 801. Example applications can include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 809. For example, the applications can include client-operating applications that correspond to server-side applications executing on remote servers or computing devices in the cloud.

Instructions stored in the memory 803 can include, among other things, one or more of a meeting application 804, a communication application 821, and a user interface application 822 executed on the first user device 801. The communication application 821 can include one or more of computer-executable instructions for operating a network interface card and a driver for operating the network interface card. Communication between the first user device 801 and other devices can occur using any protocol or mechanism over a wired or wireless connection or across the network 809. In some examples, the communication application 821 is operable with RF and short-range communication technologies using electronic tags, such as NFC tags, Bluetooth® brand tags, etc.

In some examples, the user interface application 822 includes a graphics application for displaying data to the user and receiving data from the user. The user interface application 822 can include computer-executable instructions for operating the graphics card to display search results and corresponding images or speech on or through the presentation components 812. The user interface application 822 can interact with the various sensors 824 and camera 825 to both capture and present information through the presentation components 807.

The meeting service 810 can be configured to receive user and environment data, such as received from the first and second user devices 801, 811, or one or more other devices, over the network 809. In certain examples, the meeting service 810 can include one or more servers, memory, databases, or processors, configured to execute different web-service computer-executable instructions, and can be configured to provide and manage one or more meeting services for one or more users or groups of users, such as users of the first and second user devices 801, 811. The meeting service 810 can be capable of providing and receiving messages or other information including images, videos, audio, text, and other communication media to or from the first and second user devices 801, 811 over the network 809.

The networking environment illustrated in FIG. 8 is an example of one suitable computing system environment and is not intended to suggest any limitation as to the scope of use or functionality of examples disclosed herein. The illustrated networking environment should not be interpreted as having any dependency or requirement related to any single component, module, index, or combination thereof, and in other examples, other network environments are contemplated.

The network 809 can include the internet, a private network, a local area network (LAN), a wide area network (WAN), or any other computer network, including various network interfaces, adapters, modems, and other networking devices for communicatively connecting the first and second user devices 801, 811 and the meeting service 810. The network 809 can also include configurations for point-to-point connections.

The meeting service 810 includes a processor 812 to process executable instructions, a memory 813 embodied with executable instructions, and a transceiver 805 to communicate over the network 809. The memory 813 can include one or more of: a meeting application 814, a communication application 831, a stored event application 832, a selection application 833, a pin application 834, or one or more other applications, modules, or devices, etc. While the meeting service 810 is illustrated as a single box, it is not so limited, and can be scalable. For example, the meeting service 810 can include multiple servers operating various portions of software that collectively generate composite icons or templates for users of the first and second user devices 801, 811.

The user database 835 can provide backend storage of Web, user, and environment data that can be accessed over the network 809 by the meeting service 810 or the first user device 801 and used by the meeting service 810 to combine subsequent data in a communication stream. The Web, user, and environment data stored in the database includes, for example but without limitation, one or more user profiles 836 and user events 837. Additionally, though not shown for the sake of clarity, the servers of the user database 835 can include their own processors, transceivers, and memory. Also, the networking environment depicts the user database 835 as a collection of separate devices from the meeting service 810. However, examples can store the discussed Web, user, and environment data shown in the user database 835 on the meeting service 810.

The user profiles 836 can include electronically stored collection of information related to the user. Such information can be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc.

Additionally, the user profiles 836 can include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 836 can be expanded to encompass various other aspects of the user.

The present disclosure relates to systems and methods for providing a command-based personalized composite template in a communication stream according to at least the examples provided in the sections below:

(A1) In one aspect, some embodiments or examples include automatically adjusting a participation queue among multiple participants of a communication session, including receiving inputs from respective computing devices of at least two participants of the multiple participants, wherein the inputs include a gesture captured by an image capturing device, a voice signal captured by an audio sensing device, or an input signal entered via a user input device, determining that the received inputs representing an event indicative of contribution requests to speak or share content in the communication session, aggregating the contribution requests for each of the multiple participants of the communication session, adding the contribution requests as entries to the participation queue, the participation queue including entries from at least two participants of the multiple participants, calculating a participation metric for each of the multiple participants of the communication session, the participation metric based at least in part on the aggregated contribution requests or an amount of verbal contribution for each of the multiple participants to the communication session, determining a participation metric threshold for the communication session based at least in part on the calculated participation metrics for each of the multiple participants of the communication session, determining an order of entries in the participation queue based on a comparison of the participation metrics of the respective participants in the participation queue to the determined participation metric threshold, to increase a priority, in the order of the participation queue, of an entry of a respective participant having a calculated participation metric below the determined participation metric threshold, and causing the participation queue to be displayed, with the determined order of entries, to a first user of the communication session.

(A2) In some embodiments of A1, calculating the participation metric for each of the multiple participants of the communication session includes as a function of (1) the determined amount of verbal contribution for each of the multiple participants to the communication session and (2) the aggregated contribution requests for each of the multiple participants.

(A3) In some embodiments of A1-A2, determining the amount of verbal contribution for each of the multiple participants to the communication session includes determining an amount of written contribution for each of the multiple participants to the communication session, determining an amount of audible contribution for each of the multiple participants to the communication session, and aggregating the determined amounts of written contribution and audible contribution for each of the multiple participants to determine the amount of verbal contribution for each of the multiple participants to the communication session.

(A4) In some embodiments of A1-A3, some embodiments or examples include causing the calculated participation metric for each of the multiple participants to be displayed to the first user of the communication session, wherein the first user is an organizer of the communication session and the multiple participants are attendees of the communication session.

(A5) In some embodiments of A1-A4, some embodiments or examples include causing the calculated participation metric for each of the multiple participants to be displayed to each of the multiple participants of the communication session.

(A6) In some embodiments of A1-A5, the input signal entered via a user input device includes received raise-hand indications, and calculating the participation metric for each of the multiple participants includes as a function of a number of received raise-hand indications for the communication session.

(A7) In some embodiments of A1-A6, the communication session includes a recurring communication session, and aggregating the contribution requests includes across the recurring communication sessions.

(A8) In some embodiments of A1-A7, the participation metric for the respective participant includes a number of words in a transcript of the recurring communication session.

(A9) In some embodiments of A1-A8, some embodiments or examples include comparing the participation metrics of each of the multiple participants of the communication session to the determined participation metric threshold and automatically causing a notification to be displayed to the first user if any of the calculated participation metrics fails to meet the determined participation metric threshold.

(A10) In some embodiments of A1-A9, the multiple participants include multiple participant groups, each of the multiple participant groups including at least one of the multiple participants of the communication session, and the method includes
calculating a participation metric for each of the multiple participant groups, including aggregating the participation metrics of the participants of a respective participant group
determining a participation metric group threshold for the communication session based at least in part on the calculated participation metrics for each of the participant groups, comparing the participation metrics of each of the multiple participant groups of the communication session to the determined participation metric group threshold, and automatically causing a notification to be displayed to the first user if any of the calculated participation metrics of the multiple participant groups fails to meet the determined participation metric group threshold.

In yet another aspect, some embodiments include a system including a processor and a memory device coupled to the processor and having a program stored thereon for execution by the processor to perform operations comprising any of the embodiments of A1-A10 described above in various combinations or permutations. In yet another aspect, some embodiments include a non-transitory computer-readable storage medium storing one or more programs for execution by one or more processors of a storage device, the one or more programs including instructions for performing any of the embodiments of A1-A10 described above in various combinations or permutations. In yet another aspect, some embodiments include a method or a system including means for performing any of the embodiments of A1-A108 described above in various combinations or permutations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

What is claimed is:

1. A system for automatically adjusting a participation queue among multiple participants of a communication session, comprising:
 one or more processors; and
 a memory storing computer-executable instructions that, when executed, cause the one or more processors to control the system to perform operations comprising:
 receiving inputs from respective computing devices of at least two participants of the multiple participants, wherein the inputs include a gesture captured by an image capturing device, a voice signal captured by an audio sensing device, or an input signal entered via a user input device;
 determining that the received inputs representing an event indicative of contribution requests to speak or share content in the communication session;
 aggregating the contribution requests for each of the multiple participants of the communication session;
 adding the contribution requests as entries to the participation queue, the participation queue including entries from at least two participants of the multiple participants;
 calculating a participation metric for each of the multiple participants of the communication session, the participation metric based at least in part on the aggregated contribution requests or an amount of verbal contribution for each of the multiple participants to the communication session;
 determining a participation metric threshold for the communication session based at least in part on the calculated participation metrics for each of the multiple participants of the communication session;
 determining an order of entries in the participation queue based on a comparison of the participation metrics of the respective participants in the participation queue to the determined participation metric threshold, to increase a priority, in the order of the participation queue, of an entry of a first respective participant having a calculated participation metric not meeting a threshold condition based on the determined participation metric threshold for the communication session, in contrast to an entry of a second respective participant having a calculated participation metric meeting the threshold condition based on the determined participation metric threshold for the communication session; and
 causing the participation queue to be displayed, with the determined order of entries, to a first user of the communication session.

2. The system of claim 1,
 wherein calculating the participation metric for each of the multiple participants of the communication session includes as a function of (1) the determined amount of verbal contribution for each of the multiple participants to the communication session and (2) the aggregated contribution requests for each of the multiple participants.

3. The system of claim 2,
 wherein determining the amount of verbal contribution for each of the multiple participants to the communication session includes:
 determining an amount of written contribution for each of the multiple participants to the communication session;
 determining an amount of audible contribution for each of the multiple participants to the communication session; and
 aggregating the determined amounts of written contribution and audible contribution for each of the multiple participants to determine the amount of verbal contribution for each of the multiple participants to the communication session.

4. The system of claim 2, the operations comprising:
 causing the calculated participation metric for each of the multiple participants to be displayed to the first user of the communication session,
 wherein the first user is an organizer of the communication session, and wherein the multiple participants are attendees of the communication session.

5. The system of claim 2, the operations comprising:
 causing the calculated participation metric for each of the multiple participants to be displayed to each of the multiple participants of the communication session.

6. The system of claim 2,
 wherein the input signal entered via a user input device includes received raise-hand indications, and
 wherein calculating the participation metric for each of the multiple participants includes as a function of a number of received raise-hand indications for the communication session.

7. The system of claim 1,
 wherein the communication session comprises a recurring communication session, and
 wherein aggregating the contribution requests includes across the recurring communication sessions.

8. The system of claim 7,
 wherein the participation metric for the respective participant includes a number of words in a transcript of the recurring communication session.

9. The system of claim 1, the operations comprising:
 comparing the participation metrics of each of the multiple participants of the communication session to the determined participation metric threshold; and
 automatically causing a notification to be displayed to the first user if any of the calculated participation metrics fails to meet the determined participation metric threshold.

10. The system of claim 1,
 wherein the multiple participants include multiple participant groups, each of the multiple participant groups including at least one of the multiple participants of the communication session, and
 wherein the operations comprise:
 calculating a participation metric for each of the multiple participant groups, including aggregating the participation metrics of the participants of a respective participant group,
 determining a participation metric group threshold for the communication session based at least in part on the calculated participation metrics for each of the participant groups;
 comparing the participation metrics of each of the multiple participant groups of the communication session to the determined participation metric group threshold; and
 automatically causing a notification to be displayed to the first user if any of the calculated participation metrics of the multiple participant groups fails to meet the determined participation metric group threshold.

11. A method for automatically adjusting a participation queue among multiple participants of a communication session, comprising:
 receiving inputs from respective computing devices of at least two participants of the multiple participants, wherein the inputs include a gesture captured by an image capturing device, a voice signal captured by an audio sensing device, or an input signal entered via a user input device;

determining that the received inputs representing an event indicative of contribution requests to speak or share content in the communication session;

aggregating the contribution requests for each of the multiple participants of the communication session;

adding the contribution requests as entries to the participation queue, the participation queue including entries from at least two participants of the multiple participants;

calculating a participation metric for each of the multiple participants of the communication session, the participation metric based at least in part on the aggregated contribution requests or an amount of verbal contribution for each of the multiple participants to the communication session;

determining a participation metric threshold for the communication session based at least in part on the calculated participation metrics for each of the multiple participants of the communication session;

determining an order of entries in the participation queue based on a comparison of the participation metrics of the respective participants in the participation queue to the determined participation metric threshold, to increase a priority, in the order of the participation queue, of an entry of a first respective participant having a calculated participation metric not meeting a threshold condition based on the determined participation metric threshold for the communication session, in contrast to an entry of a second respective participant having a calculated participation metric meeting the threshold condition based on the determined participation metric threshold for the communication session; and causing the participation queue to be displayed, with the determined order of entries, to a first user of the communication session.

12. The method of claim 11,
wherein calculating the participation metric for each of the multiple participants of the communication session includes as a function of (1) the determined amount of verbal contribution for each of the multiple participants to the communication session and (2) the aggregated contribution requests for each of the multiple participants.

13. The method of claim 12,
wherein determining the amount of verbal contribution for each of the multiple participants to the communication session includes:
determining an amount of written contribution for each of the multiple participants to the communication session;
determining an amount of audible contribution for each of the multiple participants to the communication session; and
aggregating the determined amounts of written contribution and audible contribution for each of the multiple participants to determine the amount of verbal contribution for each of the multiple participants to the communication session.

14. The method of claim 12, comprising:
causing the calculated participation metric for each of the multiple participants to be displayed to the first user of the communication session, wherein the first user is an organizer of the communication session, and wherein the multiple participants are attendees of the communication session.

15. The method of claim 12,
wherein the input signal entered via a user input device includes received raise-hand indications, and
wherein calculating the participation metric for each of the multiple participants includes as a function of a number of received raise-hand indications for the communication session.

16. The method of claim 11,
wherein the communication session comprises a recurring communication session, and
wherein aggregating the contribution requests includes across the recurring communication sessions.

17. The method of claim 16,
wherein the participation metric for the respective participant includes a number of words in a transcript of the recurring communication session.

18. The method of claim 11, comprising:
comparing the participation metrics of each of the multiple participants of the communication session to the determined participation metric threshold; and
automatically causing a notification to be displayed to the first user if any of the calculated participation metrics fails to meet the determined participation metric threshold.

19. The method of claim 11,
wherein the multiple participants include multiple participant groups, each of the multiple participant groups including at least one of the multiple participants of the communication session, and
wherein the method includes:
calculating a participation metric for each of the multiple participant groups, including aggregating the participation metrics of the participants of a respective participant group, determining a participation metric group threshold for the communication session based at least in part on the calculated participation metrics for each of the participant groups;
comparing the participation metrics of each of the multiple participant groups of the communication session to the determined participation metric group threshold; and
automatically causing a notification to be displayed to the first user if any of the calculated participation metrics of the multiple participant groups fails to meet the determined participation metric group threshold.

20. A system for automatically adjusting a participation queue among multiple participants of a communication session, comprising:
means for receiving inputs from respective computing devices of at least two participants of the multiple participants, wherein the inputs include a gesture captured by an image capturing device, a voice signal captured by an audio sensing device, or an input signal entered via a user input device;
means for determining that the received inputs representing an event indicative of contribution requests to speak or share content in the communication session;
means for aggregating the contribution requests for each of the multiple participants of the communication session;
means for adding the contribution requests as entries to the participation queue, the participation queue including entries from at least two participants of the multiple participants;

means for calculating a participation metric for each of the multiple participants of the communication session, the participation metric based at least in part on the aggregated contribution requests or an amount of verbal contribution for each of the multiple participants to the communication session;

means for determining a participation metric threshold for the communication session based at least in part on the calculated participation metrics for each of the multiple participants of the communication session;

means for determining an order of entries in the participation queue based on a comparison of the participation metrics of the respective participants in the participation queue to the determined participation metric threshold, to increase a priority, in the order of the participation queue, of an entry of a first respective participant having a calculated participation metric not meeting a threshold condition based on the determined participation metric threshold for the communication session, in contrast to an entry of a second respective participant having a calculated participation metric meeting the threshold condition based on the determined participation metric threshold for the communication session; and means for causing the participation queue to be displayed, with the determined order of entries, to a first user of the communication session.

* * * * *